United States Patent [19]

Kasemeier et al.

[11] Patent Number: 4,907,470
[45] Date of Patent: Mar. 13, 1990

[54] DIFFERENTIAL HOUSING SUPPORT

[75] Inventors: James E. Kasemeier, Waterloo, Iowa; Gary R. Fichtinger, Hazel Green, Wis.

[73] Assignee: Deere & Company, Moline, Ill.

[21] Appl. No.: 388,462

[22] Filed: Aug. 2, 1989

[51] Int. Cl.[4] ............................................. F16H 57/02
[52] U.S. Cl. .................................... 74/606 R; 74/607; 180/248; 475/346
[58] Field of Search ................. 74/606 R, 606 A, 607, 74/710–715; 180/248, 247, 249

[56] References Cited

U.S. PATENT DOCUMENTS

| | | | |
|---|---|---|---|
| 2,241,606 | 5/1941 | Kysor | 74/607 |
| 3,238,812 | 3/1966 | Hedstrom | 74/607 |
| 3,930,421 | 1/1976 | Geis | 74/607 |
| 4,046,030 | 9/1977 | Suzuki | 74/710 |
| 4,341,281 | 7/1982 | Nagy | 180/247 |
| 4,546,848 | 10/1985 | Iijima et al. | |
| 4,603,865 | 8/1986 | Bien | 74/606 R X |
| 4,610,175 | 9/1986 | Weis et al. | 74/606 R X |
| 4,619,158 | 10/1986 | Nelson | 74/710 |
| 4,656,885 | 4/1987 | Hori et al. | 74/710 X |
| 4,696,199 | 9/1987 | Fabbri | 74/606 R X |
| 4,719,812 | 1/1988 | Machida et al. | 74/606 R X |

FOREIGN PATENT DOCUMENTS

| | | | |
|---|---|---|---|
| 3546522 | 7/1987 | Fed. Rep. of Germany | 74/710 |
| 0046046 | 2/1987 | Japan | 74/710 |
| 407465 | 3/1934 | United Kingdom | 74/710 |

OTHER PUBLICATIONS

Caterpillar "Power Train-Power Transmission Unit", from Caterpillar Parts Book for Model 508 Skidders and Grapple Skidders, p. 92, 1986.

Primary Examiner—Vinh T. Luong

[57] ABSTRACT

A differential housing support assembly includes a pivot pin which projects from an end of the housing and is pivotally received in an annual ring of a support bracket which is bolted to a vehicle frame member. A cover plate is bolted to an end fact of the ring and includes a central portion which is directly engageable with an end of the pivot pin. Free play between the pivot pin and the cover plate is adjusted by controlling the number of annular shims placed between the annular ring and the cover plate.

4 Claims, 4 Drawing Sheets

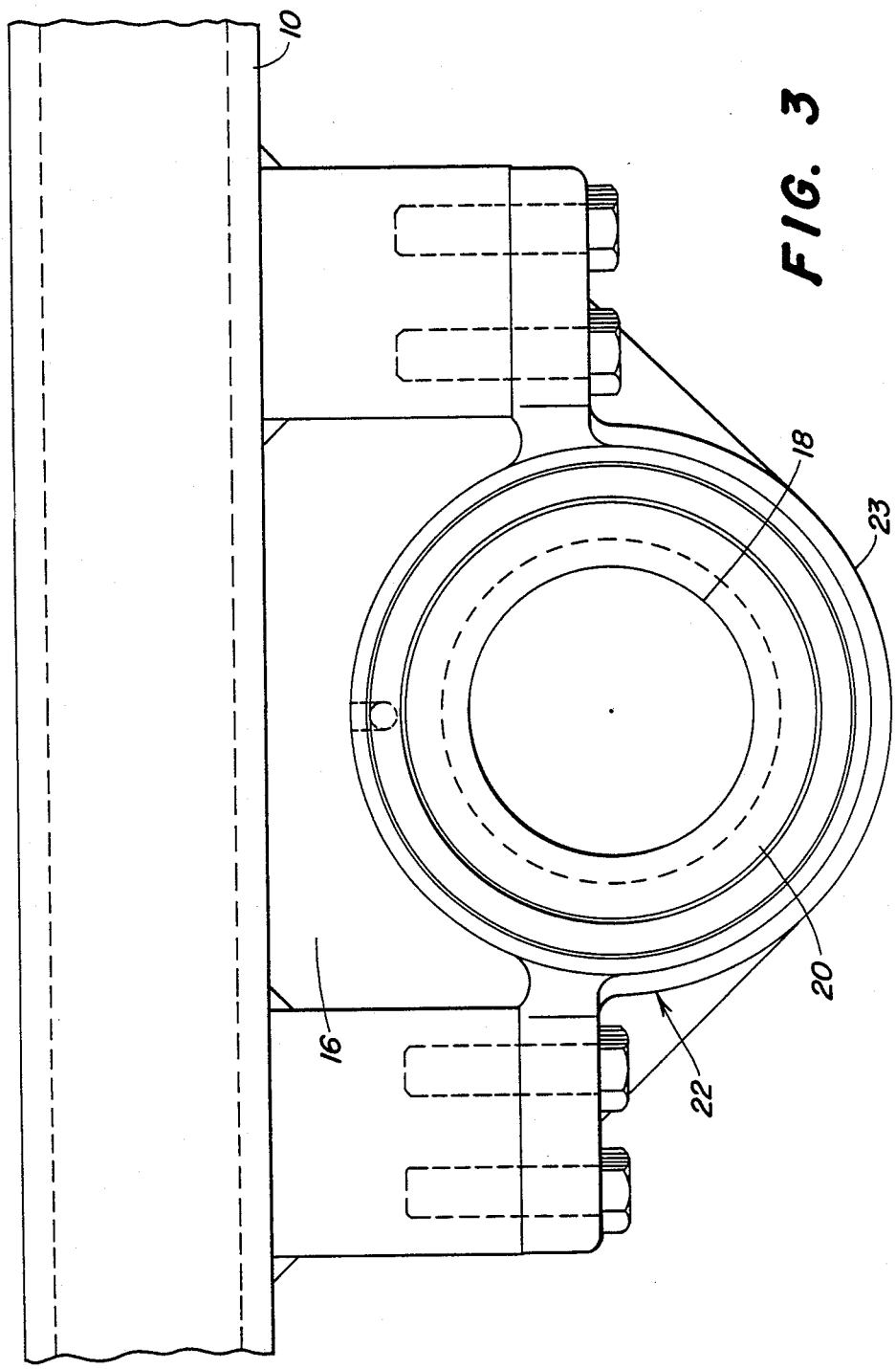

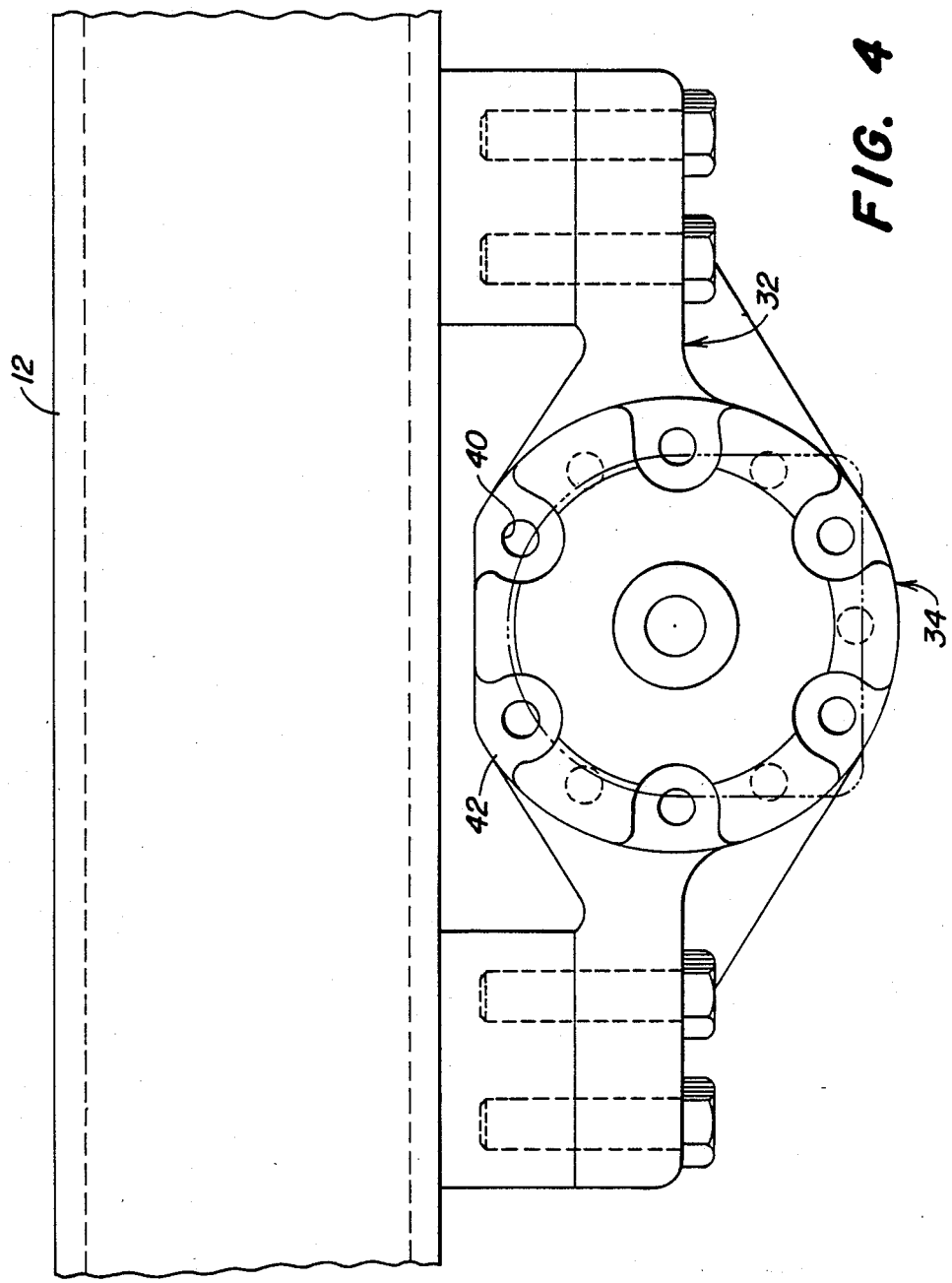

DIFFERENTIAL HOUSING SUPPORT

BACKGROUND OF THE INVENTION

The present invention relates to a differential gear housing supporting apparatus for a vehicle and more specifically to such a supporting apparatus for a housing and axle which is pivotal about the fore-and-aft axis of the drive shaft.

Certain vehicles have axles and differential housings which may oscillate about an axis of the vehicle drive shaft. In such cases, the differential housing is pivotally supported from vehicle frame members at opposite ends of the housing.

Such supports must also permit a certain amount of axial free-play movement of the differential housing between the two pivot supports. In one known design, this free play is determined by the number of shims placed between one of the pivot support brackets and wear plates which are positioned adjacent to the differential housing. This pivot support assembly includes a central pivot pin which is inserted through the support bracket, the shims, the wear plates and into a pivot bushing which is inserted into an end of the differential housing. With such a support assembly, the number of shims can be adjusted only by installing the entire axle and differential, measuring the free play, removing the entire axle and differential, adding or subtracting the correct number of shims, and then reinstalling the axle and differential housing.

In another known design, axial thrust is taken up by a disc which is received by the pivot support and held in place by a cover which is bolted to the pivot support. This design requires that the pivot support to be larger than what is needed merely to carry the load. Accordingly, it would be desirable to have a pivot support assembly which is compact and which permits simple free play adjustment without removal of the axle and housing.

SUMMARY OF THE INVENTION

An object of the present invention is to provide a differential/axle housing support assembly which is compact and which permits simple free play adjustments.

These and other objects are achieved by the present invention wherein a cylindrical pivot pin projects from the anti-drive end of a differential housing and is received and supported by a bushing and a hollow annular pivot ring of a pivot support which is bolted to a vehicle frame member. A cover plate is attached to the end of the ring and includes a central portion which is directly engageable with the pivot pin to limit the axial movement thereof. One or more annular shims are held between the radially outer portion of the cover plate on the annular end surface of the ring. The number of shims can be adjusted merely by removing the cover plate while the pivot pin remains supported by the pivot support.

BRIEF DESCRIPTION OF DRAWINGS

FIG. 3 is a view along lines 3—3 of FIG. 1.

FIG. 4 is a view along lines 4—4 of FIG. 1.

DETAILED DESCRIPTION

Figure 1:
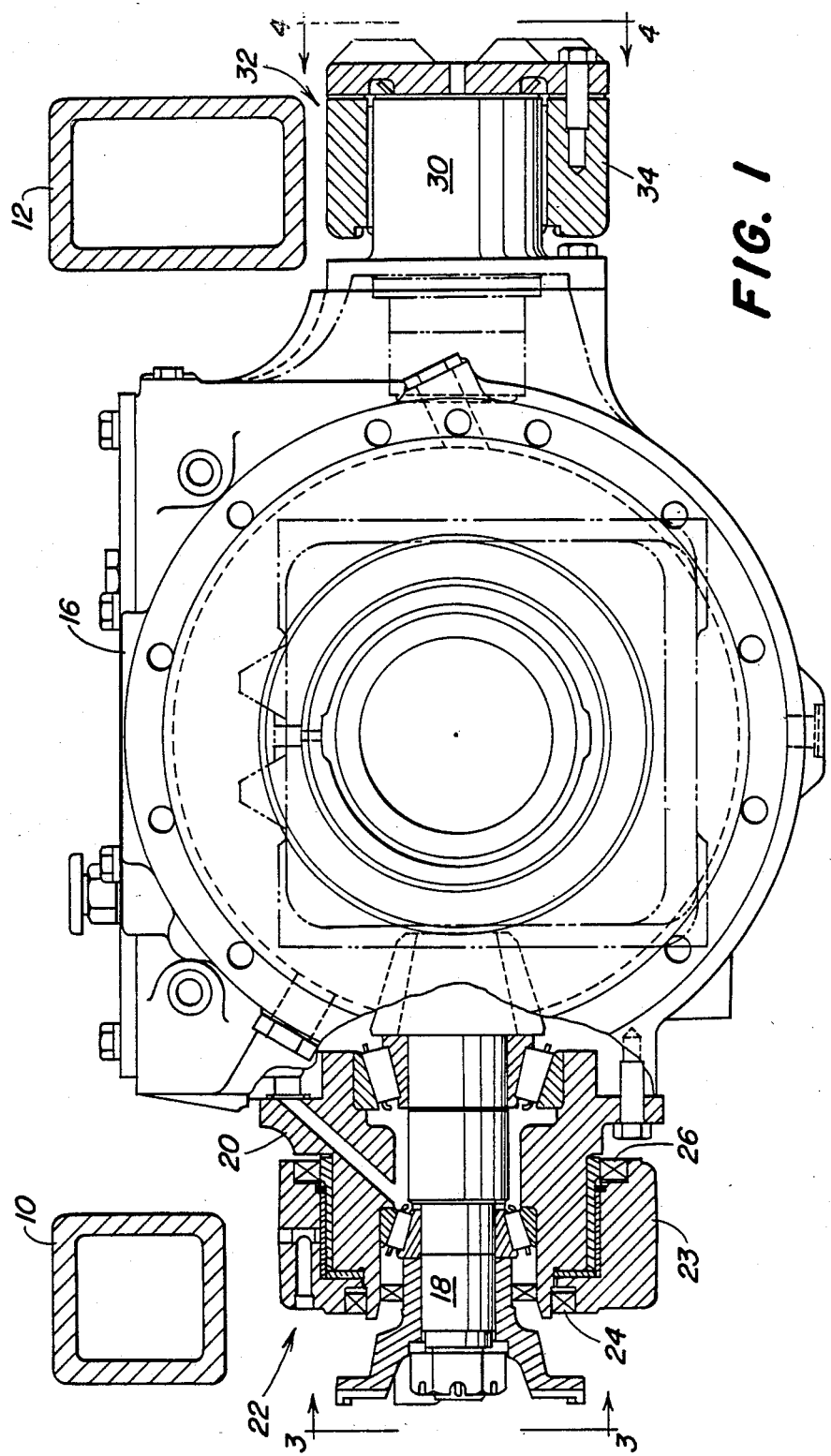
FIG. 1 is a side view of a differential housing including an anti-drive end support assembly according to the present invention.
Figure 2:
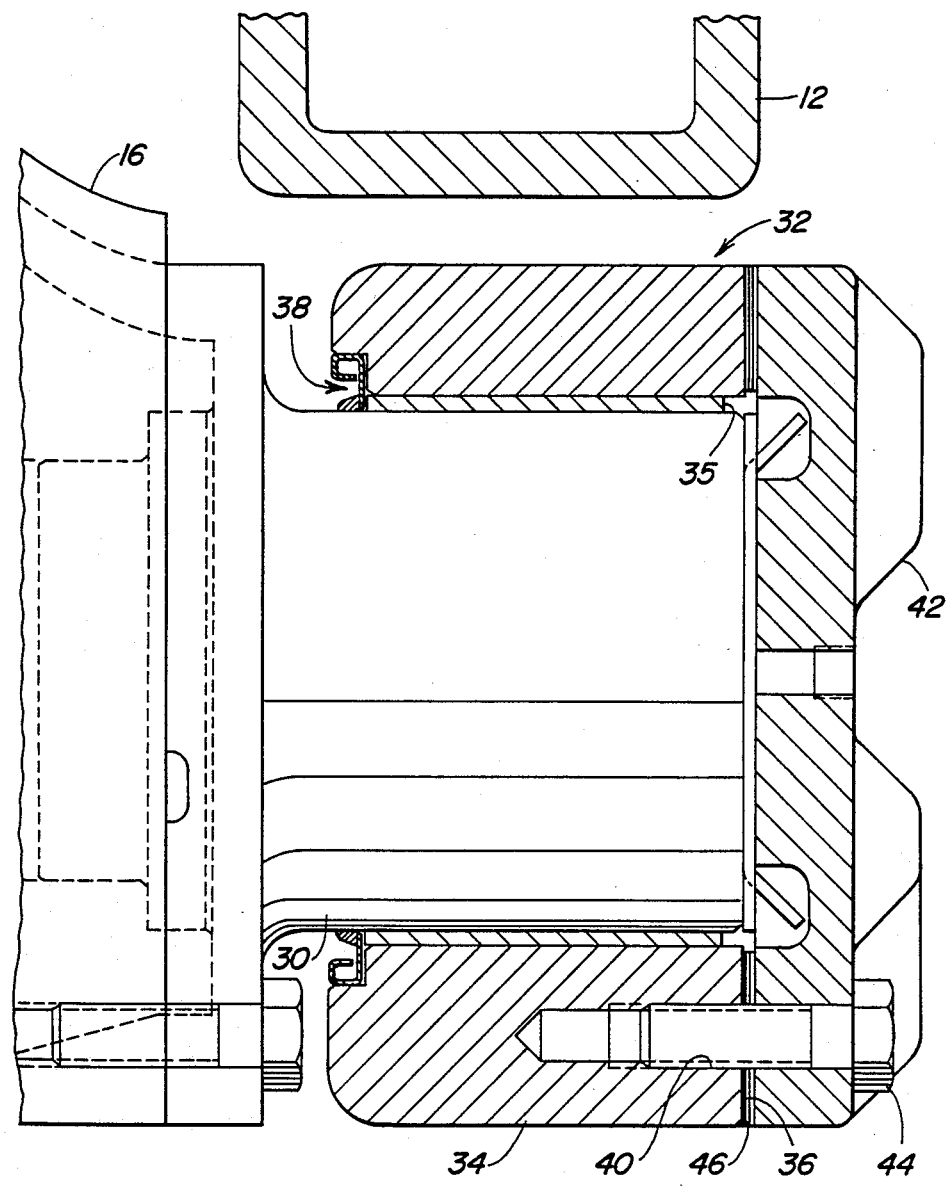
FIG. 2 is an enlarged side view of the anti-drive end support assembly of the present invention.

A vehicle (not shown) includes a pair of frame members 10 and 12 which extend laterally parallel to and on opposite sides of an axle 14 of the vehicle. A differential includes a housing 16 with a drive end for connecting to a drive shaft 18. A hollow cylindrical quill 20 is fixed via bolts to the drive end of the housing. A first support 22 has a support ring 23 which pivotally supports the quill via bearings 24 and 26. The support 22 is bolted to frame member 10, as best seen in FIG. 3.

Referring now to FIGS. 1 and 4, a preferably solid cylindrical pivot pin 30 is bolted to and projects from the anti-drive end of housing 16 opposite quill 20. A second support member 32 includes a hollow support ring 34 which pivotally receives a bushing 35 and the pivot pin 30. The support member 32 is bolted to frame member 12 as best seen in FIG. 4. A seal 38 protects the space between ring 34 and pivot pin 30 from contamination. The ring 34 has an annular axially facing end face 36 into which extend a plurality of blind, threaded bores 40.

A cover plate 42 with a generally circular outer periphery is attached to the ring 34 via bolts 44 which are threaded into bores 40. One or more annular spacer members 46 are located between end face 36 and cover plate 42 to adjust the clearance between cover plate 42 and the end of pivot pin 30. By adjusting the numbers of spacer members 46, the amount of free play movement of differential housing 16 in a direction parallel to the axis of the drive shaft can be adjusted as desired. The cover plate 42 has a central portion which is directly engageable with the end of the pivot pin 30 to limit the axial movement of the housing 16 so that no additional thrust plate need be inserted into the ring 32 of support member 32. This provides a compact, easily adjustable pivot support assembly.

While the invention has been described in conjunction with a specific embodiment, it is to be understood that many alternatives, modifications and variations will be apparent to those skilled in the art of light of the aforegoing description.

Accordingly, this invention is intended to embrace all such alternatives, modifications and variations which fall within the spirit and scope of the appended claims.

We claim:

1. In combination a vehicle having a frame, a differential housing having a drive end for receiving a drive shaft and having an anti-drive, and characterized by:
   a pivot pin fixed to and extending from the anti-drive end of the housing;
   a support member having a hollow annular ring for pivotally receiving the pivot pin and bracket means for securing the ring to a frame of the vehicle, the ring having an axially facing end surface;
   a cover plate attached to the ring and having a central portion defining an abutment surface engageable directly with an end of the pivot pin;
   means for releasably attaching the cover plate to the end face of the ring; and
   at least one annular spacer member held between the cover plate and the annular end face of the ring to determine an amount of axial free play between the pivot pin and the abutment surface of the cover plate.

2. The invention of claim 1, wherein:

a plurality of the annular spacer members are held between the cover plate and the end face of the ring, each of the plurality of spacer members engaging at least one adjacent spacer member.

3. The invention of claim 2, wherein:
each spacer member includes a central opening through which the pivot pin may project.

4. The invention of claim 1, wherein:
the at least one spacer member has a plurality of apertures extending axially therethrough, the means for attaching extending through said plurality of apertures.

* * * * *

UNITED STATES PATENT AND TRADEMARK OFFICE
CERTIFICATE OF CORRECTION

PATENT NO. : 4,907,470

DATED : 13 March 1990

INVENTOR(S) : James Edward Kasemeier et al.

It is certified that error appears in the above-identified patent and that said Letters Patent is hereby corrected as shown below:

In Col. 2, line 56, delete "a" and insert -- said --.

Signed and Sealed this

Fourth Day of June, 1991

Attest:

HARRY F. MANBECK, JR.

*Attesting Officer*

*Commissioner of Patents and Trademarks*